US012670091B2

(12) United States Patent
Fultheim et al.

(10) Patent No.: US 12,670,091 B2
(45) Date of Patent: Jun. 30, 2026

(54) USAGE DRIVEN MEMORY MAPPING

(71) Applicant: HUAWEI TECHNOLOGIES CO., LTD., Shenzhen (CN)

(72) Inventors: Shai Fultheim, Hod Hasharon (IL); Rui Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/814,148

(22) Filed: Aug. 23, 2024

(65) Prior Publication Data

US 2024/0419584 A1 Dec. 19, 2024

Related U.S. Application Data

(63) Continuation of application No. PCT/CN2022/077510, filed on Feb. 23, 2022.

(51) Int. Cl.
*G06F 12/02* (2006.01)

(52) U.S. Cl.
CPC ................................. *G06F 12/023* (2013.01)

(58) Field of Classification Search
CPC .. G06F 3/0647; G06F 3/0658; G06F 11/3037; G06F 11/3471; G06F 12/023; G06F 12/0284; G06F 12/0653; G06F 2201/81; G06F 2201/88; G06F 2212/657
See application file for complete search history.

(56) References Cited

U.S. PATENT DOCUMENTS

| | | | | |
|---|---|---|---|---|
| 2004/0083335 A1* | 4/2004 | Gonzalez | ............ | G06F 12/0246 |
| | | | | 711/159 |
| 2013/0268741 A1* | 10/2013 | Daly | .................... | G06F 12/023 |
| | | | | 711/E12.002 |

(Continued)

FOREIGN PATENT DOCUMENTS

| | | |
|---|---|---|
| EP | 3414665 B1 | 11/2021 |
| JP | 2019056972 A | 4/2019 |

(Continued)

OTHER PUBLICATIONS

Agarwal et al., "Thermostat: Application-transparent Page Management for Two-tiered Main Memory," ASPLOS '17: Proceedings of the 22nd International Conference on Architectural Support for Programming Languages and Operating Systems, Total 14 pages (Apr. 8-12, 2017).

(Continued)

*Primary Examiner* — Aracelis Ruiz
(74) *Attorney, Agent, or Firm* — Leydig, Voit & Mayer, Ltd.

(57) ABSTRACT

An apparatus for executing a software program, comprising: a processing unit; at least one memory component, each connected to the processing unit and mapped to a range of memory addresses of the processing unit; and a memory mapping circuitry connected to the processing unit and to the memory components and configured for: in each of a plurality of iterations: accessing statistical counters collected while the processing unit executes the software program; and generating a mapping between a first memory address range and a second memory address range, subject to identifying the first range and the second range according to an analysis of the statistical counters; and in response to receiving from the processing unit a memory access command comprising a first memory address in the first range, replacing in the memory access command the first memory address with a second memory address in the second range according to the mapping.

13 Claims, 5 Drawing Sheets

(56) References Cited

U.S. PATENT DOCUMENTS

| | | | | |
|---|---|---|---|---|
| 2017/0228322 A1* | 8/2017 | Chang | ..................... | G06F 3/061 |
| 2020/0081826 A1* | 3/2020 | Bennett | ................. | G06F 12/128 |
| 2022/0035735 A1 | 2/2022 | Bhardwaj | | |

FOREIGN PATENT DOCUMENTS

| | | | |
|---|---|---|---|
| JP | 2020524339 A | 8/2020 |
| KR | 20130022604 A | 3/2013 |
| KR | 20150082461 A | 7/2015 |
| KR | 20200108359 A | 9/2020 |

OTHER PUBLICATIONS

Carr et al., "WSCLOCK—a Simple and Effective Algorithm for Virtual Memory Management," SOSP '81, Proceedings of the 8th ACM symposium on Operating systems principles, Total 9 pages (Dec. 1981).

Zhou et al., "The Multi-Queue Replacement Algorithm for Second Level Buffer Caches," Proceedings of the 2001 USENIX Annual Technical Conference, Total 15 pages (Jun. 25-30, 2001).

Yan et al., "Nimble Page Management for Tiered Memory Systems," Session: VM/Memory, ASPLOS'19, Providence, RI, USA, total 15 pages (Apr. 13-17, 2019).es.

Corbet et al., "AutoNUMA: the other approach to NUMA scheduling," [online]https://lwn.net/Articles/488709/, total 5 pages (Mar. 2012).

Dashti et al., "Traffic Management: a Holistic Approach to Memory Placement on NUMA Systems," ASPLOS'13, Proceedings of the 18th international conference on Architectural support for programming languages and operating systems, Total 13 pages (Mar. 16-20, 2013).

Meswani et al., "Heterogeneous Memory Architectures: a HW/SW Approach for Mixing Die-stacked and off-package Memories," Total 11 pages (Mar. 2015).

* cited by examiner

200

201
Memory
address
ranges

| 201A Range of memory addresses |
| 201B Range of memory addresses |
| 201C Range of memory addresses |
| 201D Range of memory addresses |
| 201E Range of memory addresses |
| 201F Range of memory addresses |

120A
Memory
Component

120B
Memory
Component

120C
Memory
Component

500

USAGE DRIVEN MEMORY MAPPING

CROSS-REFERENCE TO RELATED APPLICATIONS

This application is a continuation of International Application No. PCT/CN2022/077510, filed on Feb. 23, 2022, the disclosure of which is hereby incorporated by reference in its entirety.

BACKGROUND

The present disclosure relates to a computerized apparatus and, more specifically, but not exclusively, to a computerized apparatus having more than one memory component.

For brevity, henceforth the term "system" is used to mean a computerized system, and the terms are used interchangeably.

There exist myriad metrics for measuring performance of a computerized system, for example throughput, i.e. the amount of tasks performed in an identified time interval, and latency, i.e. the amount of time a task is delayed before it is performed. Improving a system's performance, for example by increasing the system's throughput, and additionally or alternatively reducing the system's latency, depends, among other factors, on an amount of computer resources available in the system and on how well various components of the system work together. For example, reducing latency when accessing memory, and additionally or alternatively increasing throughput of memory access, could improve performance of the system.

A memory component with relatively higher performance access characteristics, for example a low latency memory component or a memory component with high throughput, for example static RAM (SRAM), is typically more expensive than a memory component with lower performance access characteristics, for example dynamic RAM (DRAM). It is common practice to design a system's memory using more than one type of memory component, to balance between cost and performance of the system. Some common system designs organize a plurality of memory components in multiple tiers of memory, where a small and fast tier shadows a larger and slower tier, serving as a cache to the larger tier. In some designs there is a hierarchy of tiers, where only the largest tier is available for use by a software program, i.e. addressable using application memory addresses of the software program, and the other tiers in the hierarchy serve as a hierarchical cache.

Some other system designs make all tiers of memory addressable using application memory addresses of the software program. In such systems, the system's performance is impacted by the distribution of the software program's application memory among the multiple tiers of memory, i.e. among one or more memory components of the system. When the application memory of the software program comprises a plurality of application memory areas, performance may be improved when frequently accessed application memory areas are stored in one or more high performance memory components, whereas lower performance memory components are used for storing less frequently accessed application memory areas.

The term non-uniform memory access (NUMA) refers to a computerized system with more than one memory component, where some characteristics of memory access from a processing unit to a memory component, for example latency and additionally or alternatively throughput, depend on a topology of the system, for example a location of the memory component relative to the processing unit. In a manner similar to the systems described above, in a system with NUMA the system's performance may be impacted by the distribution of the software program's application memory among the one or more memory components.

SUMMARY

The present disclosure includes a description of an apparatus and a method for memory management. In some embodiments described herein, a memory mapping circuitry is used to map application memory of a software program executed by a processing unit among one or more memory components connected to the processing unit without requiring computation by the processing unit and without impacting memory mapping tables used by an operating system executed by the processing unit. Further in such embodiments, the memory mapping circuitry is configured for replacing in a memory access command received from the processing unit a first memory address in a first range of memory addresses with a second memory address in a second range of memory addresses according to a mapping between the first range of memory addresses and the second range of memory addresses generated according to an analysis of one or more statistical counters collected while the processing unit executes the software program. Using a memory mapping circuitry to generate a mapping between the first range of memory addresses and the second range of memory addresses and to replace a memory address in a memory access command according to the generated mapping reduces an amount of processing overhead required from the processing unit to update distribution of the plurality of application memory areas of the software program among the one or more memory components, thus increasing performance of the apparatus.

The foregoing and other objects are achieved by the features of the independent claims. Further implementation forms are apparent from the dependent claims, the description and the figures.

According to a first aspect, an apparatus for executing a software program comprises: a processing unit; at least one memory component, each connected to the processing unit and mapped to at least one range of memory addresses of a plurality of memory address ranges of the processing unit; and a memory mapping circuitry connected to the processing unit and to the at least one memory component and configured for: in each management iteration of a plurality of management iterations: accessing one or more of a plurality of statistical counters collected while the processing unit executes the software program; and generating a mapping between a first memory address range of the plurality of memory address ranges and a second memory address range of the plurality of memory address ranges, subject to identifying the first memory address range and the second memory address range according to an analysis of the one or more statistical counters; and in response to receiving from the processing unit at least one memory access command comprising a first memory address in the first memory address range, replacing in the at least one memory access command the first memory address with a second memory address in the second memory address range according to the mapping.

According to a second aspect, a method for managing memory in an apparatus for executing one or more software programs comprises: in each management iteration of a plurality of management iterations, by a memory mapping circuitry connected to a processing unit and to at least one memory component connected to the processing unit, where each of the at least one memory component is mapped to at least one range of memory addresses of a plurality of memory address ranges of the processing unit: accessing one or more of a plurality of statistical counters collected while a processing unit executes at least one of the one or more software programs; and generating a mapping between a first memory address range of the plurality of memory address ranges and a second memory address range of the plurality of memory address ranges, subject to identifying the first memory address range and the second memory address range according to an analysis of the one or more statistical counters; and in response to receiving from the processing unit at least one memory access command comprising a first memory address in the first memory address range, replacing in the at least one memory access command the first memory address with a second memory address in the second memory address range according to the mapping.

According to a third aspect, a software program product for memory management comprises: a non-transitory computer readable storage medium; first program instructions for: in each management iteration of a plurality of management iterations, by a memory mapping circuitry connected to a processing unit and to at least one memory component connected to the processing unit, where each of the at least one memory component is mapped to at least one range of memory addresses of a plurality of memory address ranges of the processing unit: accessing one or more of a plurality of statistical counters collected while a processing unit executes at least one of one or more software programs; and generating a mapping between a first memory address range of the plurality of memory address ranges and a second memory address range of the plurality of memory address ranges, subject to identifying the first memory address range and the second memory address range according to an analysis of the one or more statistical counters; and second program instructions for: in response to receiving from the processing unit at least one memory access command comprising a first memory address in the first memory address range, replacing in the at least one memory access command the first memory address with a second memory address in the second memory address range according to the mapping. According to the third aspect the first and second program instructions are executed by at least one computerized processor from the non-transitory computer readable storage medium.

In an implementation form of the first and second aspects, the plurality of statistical counters comprises a high access counter, a low access counter, and a plurality of range access counters each associated with one of the plurality of memory address ranges. Optionally, accessing the one or more statistical counters comprises: accessing at least one of the low access counter and the high access counter; performing another analysis comprising at least one of the low access counter and the high access counter; and accessing at least one range access counter subject to another outcome of the other analysis. Using a watermark counter, for example a high access counter or a low access counter, in addition to the plurality of range access counters facilitates mitigating an amount of accesses to the plurality of range access counters, reducing an amount of computing resources required for memory mapping compared to methods that access all the plurality of range access counters.

In another implementation form of the first and second aspects, the apparatus further comprises at least one memory tracking circuitry connected to the processing unit and to the at least one memory component. Optionally, at least one of the plurality of statistical counters is implemented in the at least one memory tracking circuitry that is configured for updating, in each tracking iteration of a plurality of tracking iterations, at least one of the plurality of statistical counters in response to receiving a memory access command from the processing unit. Implementing a statistical counter in a memory tracking circuitry reduces an amount of computing resources required to track one or more memory accesses compared to methods that implement the statistical counter in a page table of an operating system executed by the processing unit executing the software program. Optionally, the memory mapping circuitry is further configured for accessing the one or more of the plurality of statistical counters by accessing the at least one memory tracking circuitry. Optionally, the memory mapping circuitry is further configured for configuring in the at least one memory tracking circuitry at least one of: a low access threshold value and a high access threshold value. Optionally, the memory mapping circuitry configures in the at least one memory tracking circuitry at least one of the low access threshold value and the high access threshold value subject to yet another outcome of yet another analysis comprising the one or more statistical counters. Configuring the low access threshold value and additionally or alternatively the high access threshold increases accuracy of the high access counter and the low access counter, increasing accuracy of a memory mapping computed according to the one or more statistical counters.

In a further implementation form of the first and second aspects, the memory mapping circuitry further comprises a plurality of address mappings, each mapping one of the plurality of memory address ranges to a media address range, where the media address range is another of the plurality of memory address ranges. Mapping one of the plurality of memory address ranges to a media address range that is another of the plurality of memory address ranges allows moving an application memory area of a software program from one memory component to another memory component without modifying the page tables of an operating system that map application addresses of the software program to physical addresses of the processing unit, reducing an amount of interruptions to one or more services provided by the apparatus executing the software program. Optionally, generating the mapping between the first memory address range and the second memory address range comprises updating the respective media address range of the respective address mapping of the first memory address range to be the second memory address range. Optionally, the memory mapping circuitry is configured for executing the plurality of management iterations while the processing unit executes the software program. Executing the plurality of management iterations that generate the memory mapping while the processing unit executes the software program allows increasing performance of the apparatus executing the software program without increasing an amount of interruptions to one or more services provided by the apparatus executing the software program.

In a further implementation form of the first and second aspects, the memory mapping circuitry is further configured for: subject to identifying the first memory address range and the second memory address range according to the analysis of the plurality of statistical counters, copying at least one data value stored in a first memory component of the at least one memory component that is associated with the first memory address range to a second memory component of the at least one memory component that is associated with the second memory address range. Optionally, application memory of the software program comprises a plurality of application memory areas, each stored in one of the at least one memory component. Optionally, the at least one data value is part of at least one application memory area of the plurality of application memory areas. Copying one or more data values that are part of application memory of the software program increases performance of the apparatus executing the software program without increasing an amount of interruptions to one or more services provided by the apparatus executing the software program.

In a further implementation form of the first and second aspects, the processing unit executes the software program by executing an operating system having an operating system page size for memory management. Optionally, at least one of the plurality of memory address ranges addresses an amount of memory different from the operating system page size. Mapping memory using a memory address range having a range size that is not equal to any of the set of page sized of the operating system increases accuracy of the analysis of the one or more statistical counters, and thus increases performance of the apparatus executing the software program.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which implementations pertain. Although methods and materials similar or equivalent to those described herein can be used in the practice or testing of implementations, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
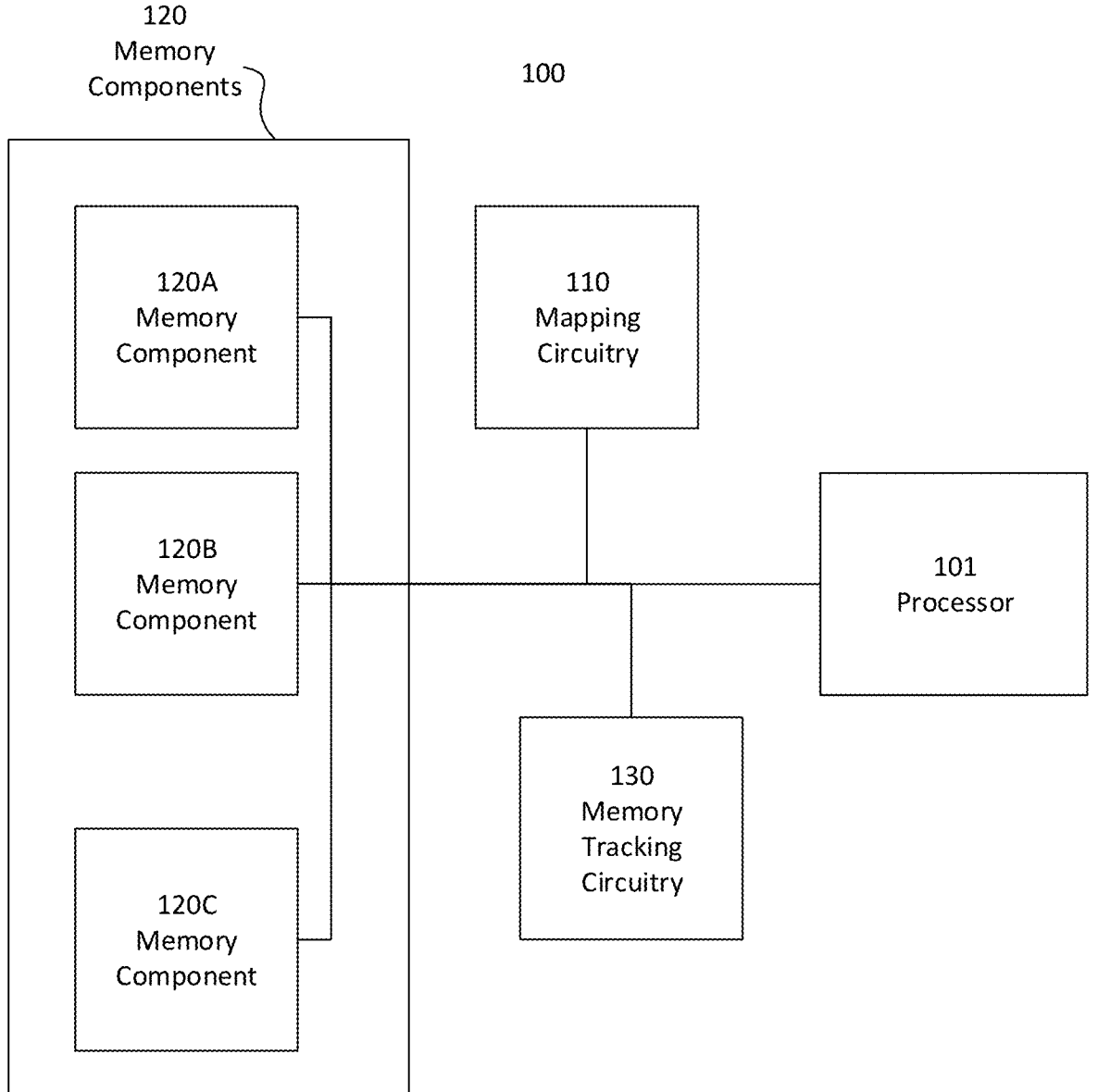
FIG. 1 is a schematic block diagram of an exemplary apparatus, according to some embodiments.

As used herein, the term "processing unit" refers to any kind of programmable or non-programmable circuitry that is configured to carry out the operations described below. The processing unit may comprise hardware as well as software. For example, the processing unit may comprise one or more processors and a transitory or non-transitory memory that carries a program which causes the processing unit to perform the respective operations when the program is executed by the one or more processors.

In addition, as used herein, the term "physical address" means an address used by the processing unit in a memory access request in order to access a memory component. In addition, as used herein, the term "application address" means an address used in an application. An application address may be a virtual address, in which case there is a need to translate the application address to a physical address for the purpose of accessing the one or more memory components. In addition, as used herein the term "media address" means an addresses recognized by a memory component. A processing unit may use a media address in a memory access request. Optionally, a memory address in a memory access request is mapped to a media address. As used herein, the term "memory mapping" refers to mapping application memory addresses of a software program to physical addresses in a memory access request sent by the processing unit. Such a mapping may be used to translate an application address to a physical address identifying a location in a memory component where application data or instructions are stored.

In addition, as used herein, the terms "memory access request" and "memory access command" are both used to mean a request to access a memory component for the purpose of reading from, and additionally or alternatively writing to, the memory component, and the terms are used interchangeably. A memory access request may be generated when executing a computer instruction of the software program comprising a memory access computer instruction.

In addition, as used herein, the terms "range of memory addresses" and "memory address range" are both used to mean a range of memory addresses and are used interchangeably.

To allocate each of the plurality of application memory areas to one or more memory components connected to a processing unit such that performance of the system is improved, some systems track accesses to the one or more memory components, and use the collected tracking information to identify an application memory area that should be moved from one memory component to another memory component. Some existing tracking methods maintain access counters in page tables used by an operating system executed by the processing unit to map application addresses of the software program to physical addresses of the processing unit. Some such methods update a counter in the page table every time memory is accessed. Analysis of a plurality of counters in the page table requires merging counters of multiple virtual pages mapped to a common physical page. Some methods additionally require sorting the plurality of counters to classify the page table entries, for example to identify page table entries that describe high access application memory areas. In addition, moving an application memory area from one memory component to another memory component requires computing resources of the processing unit for updating the page table, and possibly also for copying the application memory area from the one memory component to the other memory component. Such methods reduce the performance of the system as they require computing resources of the processing unit. In addition, one or more services provided by the system executing the software program may be interrupted while the page table is updated.

To reduce the amount of computer resources of the processing unit used to map application memory to one or more memory components, the present disclosure, in some embodiments described herein, proposes using a memory mapping circuitry connected to the processing unit and to one or more memory components to generate a mapping between one or more physical addresses of the processing unit and one or more media addresses of the one or more memory components, and to replace in a memory access command received from the processing unit a memory address of the memory access command with a media address of one of the memory components, according to the generated mapping. Optionally, the memory address of the memory access command is a first physical memory address in a first range of memory addresses of the processing unit, where the range of memory addresses is one of a plurality of memory address ranges of the processing unit. Optionally, the media address is a second physical memory address in a second range of memory addresses of the plurality of memory address ranges. Such a mapping between one or more physical addresses used by the processing unit and one or more media addresses recognized by the one or more memory components allows moving an application memory area from one memory component to another memory component without modifying the page tables of the operating system that map application addresses of the software program to physical addresses of the processing unit. Refraining from modifying the page table reduces an amount of interruptions to one or more services provided by the system executing the software program. Optionally, the memory mapping circuitry generates a mapping in each of a plurality of management iterations. Optionally, the memory mapping circuitry generates the mapping while the processing unit executes the software program.

Optionally, the mapping is generated according to an analysis of one or more statistical counters collected while the processing unit executes the software program. Optionally, a statistical counter is indicative of a plurality of memory access commands. For example, when the processing unit has a plurality of memory address ranges and each of the one or more memory components is mapped to one or more of the plurality of memory address ranges, a statistical counter may be a range access counter associated with a memory address range, indicative of an amount of times the memory address range is accessed in a plurality of memory access commands. Optionally, a statistical counter is indicative of an amount of range access counters that meet an identified criterion. For example, a statistical counter may be a watermark counter, indicative of an amount of range access counters that exceed a high access threshold value, where the high access threshold value is indicative of an amount of accesses to a memory address range that is considered high. Alternatively, a watermark counter may be indicative of an amount of range access counters that are less than a low access threshold value, where the low access threshold value is indicative of another amount of accesses to a memory address range that is considered low. Optionally, a statistical counter is indicative of an amount of memory access commands received from the processing unit. Optionally, the one or more processing circuitries receive a memory access command in each of a plurality of iterations and update at least one statistical counter of the plurality of statistical counters in each of a plurality of iterations.

Performing the analysis by the memory mapping circuitry reduces an amount of computing resources of the processing unit required to perform the analysis compared to performing the analysis by the processing unit, increasing performance of the system when executing the software program, for example by increasing throughput and additionally or alternatively reducing latency when performing one or more tasks of the software program.

Optionally, the memory mapping circuitry is further configured for copying one or more data values stored in a first memory component of the one or more memory components to a second memory components of the one or more memory components, where the first memory component is associated with the first memory address range and the second memory component is associated with the second memory address range. Optionally, the memory mapping circuitry copies the one or more data values from the first memory component to the second memory component subject to identifying the first memory address range and the second memory address range according to the analysis of the one or more statistical counter. Copying the one or more data values by the memory mapping circuitry reduces an amount of interruption to one or more services provided by the system executing the software program compared to copying the one or more data values by the processing unit.

Optionally, at least one statistical counter of the one or more statistical counters is implemented in one or more tracking circuitries connected to the processing unit and the one or more memory components. Implementing a statistical counter in a tracking circuitry reduces an amount of resources used by the processing unit to track a plurality of memory accesses, for example reduces an amount of memory accesses performed by the processing unit and additionally or alternatively reduces an amount of processor cycles of the processing unit used to compute the memory mapping. Optionally, the memory mapping circuitry is further configured for configuring the one or more tracking circuitries.

When the processing unit executes an operating system, the operating system may address the plurality of memory components using a plurality of operating system memory pages. It is common practice not to use arbitrary page sizes for the plurality of operating system memory pages, i.e. each of the plurality of operating system memory pages has one of an identified set of page sizes. When memory access tracking is done using a page table of the operating system, granularity of the memory access tracking is according to the respective page size of each of the plurality of operating system memory pages. In some embodiments described herein, at least one identified memory address range of the plurality of memory address ranges has a range size that is not equal to any of the set of page sizes. Using one or more range access counters to track the plurality of memory access commands according to the plurality of memory address ranges allows tracking the plurality of memory access commands at a granularity that is different from a page size of the operating system, increasing accuracy of a memory mapping computed according to the plurality of statistical counters compared to a memory mapping computed when tracking is according to an operating system page size and thus increases accuracy of allocation of the plurality of application memory areas to the one or more memory components, increasing performance of the system.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary apparatus, according to some embodiments. In such embodiments, a processing unit 101 is connected to at least one memory component 120.

For brevity, henceforth the term "memory components 120" is used to mean "at least one memory components 120, and the terms are used interchangeably. Optionally, the memory components 120 comprise one memory component, for example memory component 120C. Optionally, the memory components 120 comprise more than one memory component, for example memory component 120A, memory component 120B and memory component 120C. A memory component may be a random access memory (RAM) component, for example an SRAM component or a DRAM component. Other examples of a memory component include a read only memory (ROM) component, an electrically erasable programmable ROM (EEPROM) and a non-volatile RAM (NVRAM). Optionally, one or more of the memory components 120 is electrically coupled to the processing unit 101. Optionally, one or more of the memory components 120 is connected to the processing unit 101 via a host memory controller (not shown).

Optionally, one or more of the memory components 120 is a cache memory component of the processing unit 101. Optionally, one or more of the memory components 120 are connected to another cache memory component (not shown), connected additionally to the processing unit 101.

Optionally, one or more memory tracking circuitry 130 is connected to the processing unit 101 and the memory components 120. Optionally, each of the memory components 120 is mapped to at least one range of memory addresses of a plurality of memory address ranges of the processing unit 101.

Figure 2:
FIG. 2 is a schematic block diagram of an exemplary address mapping, according to some embodiments.

Reference is now made also to FIG. 2, showing a schematic block diagram of an exemplary address mapping 200, according to some embodiments. In this example, memory component 120A is mapped to range of memory addresses 201A, range of memory addresses 201B and range of memory addresses 201C of plurality of memory address ranges 201. Thus, when the processing unit 101 accesses a memory address in one of range of memory addresses 201A, range of memory addresses 201B and range of memory addresses 201C the processing unit 101 accesses memory component.

Similarly, memory component 120B is mapped to range of memory addresses 201D of plurality of memory address ranges 201, and memory component 120C is mapped range of memory addresses 201E and range of memory addresses 201F of plurality of memory address ranges 201.

Optionally, the processing unit 101 executes an operating system that addresses the memory components 120 using a plurality of operating system memory pages. Optionally each of the plurality of operating system memory pages has a page size that is one of an identified set of page sizes. Optionally, at least one of the plurality of memory address ranges 201 has a size that not a member of the identified set of page sizes.

Reference is now made again to FIG. 1. Optionally, memory mapping circuitry 110 is connected to the processing unit 101 and the memory components 120.

Optionally, memory mapping circuitry 110 comprises a plurality of address mappings. Optionally, each address mapping of the plurality of address mappings maps one of the plurality of memory address ranges 201 to a media address range, where the media address range is another of the plurality of memory address ranges 201.

Figure 3:
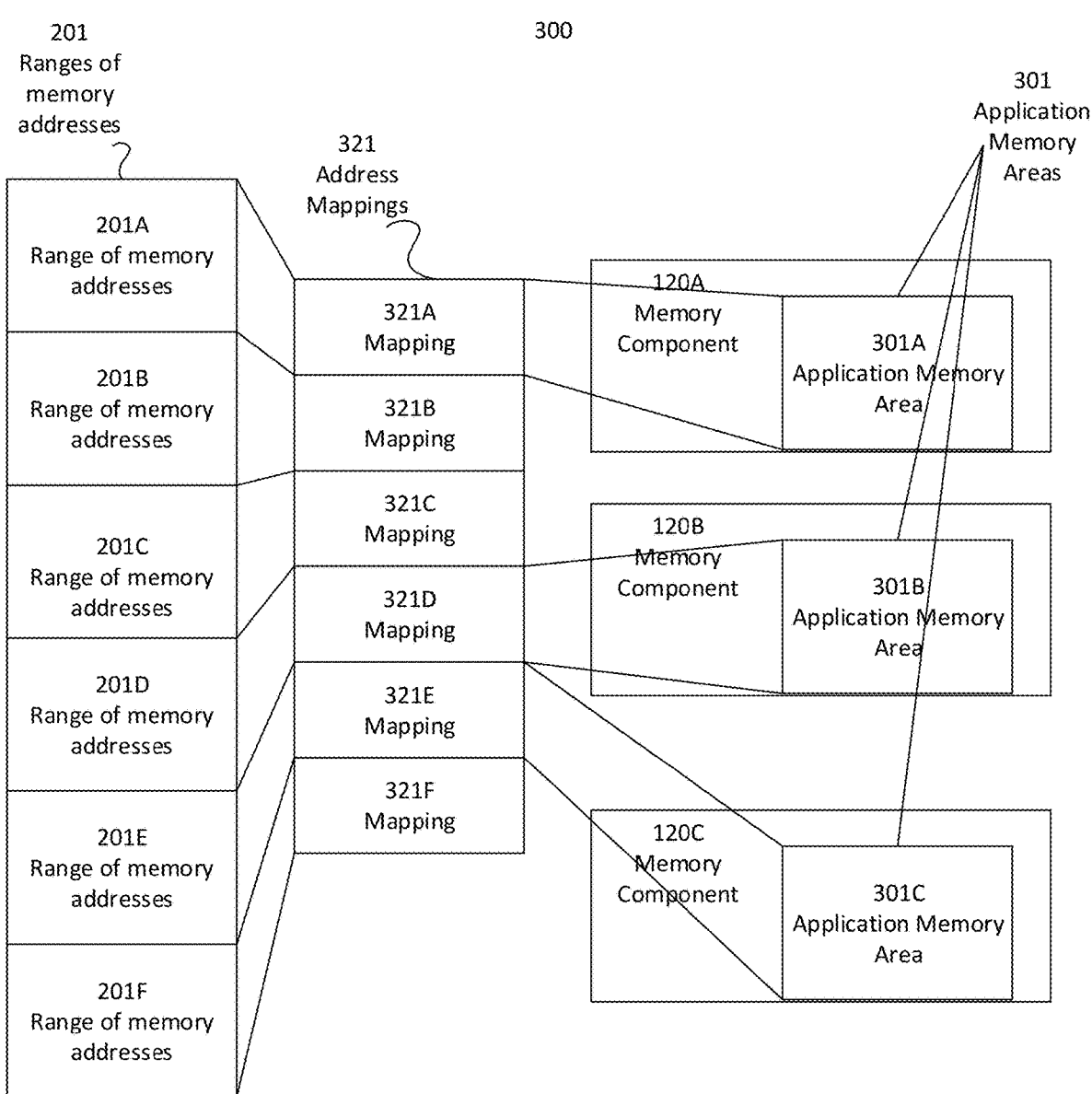
FIG. 3 is a schematic block diagram of an exemplary memory mapping, according to some embodiments.

Reference is now made also to FIG. 3, showing is a schematic block diagram of an exemplary memory mapping 300, according to some embodiments. In this example, the plurality of address mappings 321 comprises address mapping 321A, mapping range of memory addresses 201A to a range of media addresses that is a range of memory addresses associated with memory component 120A, for example range of memory addresses 201A.

Similarly, in this example the plurality of address mappings 321 comprises address mapping 321D, mapping range of memory addresses 201D to another range of media addresses that is another range of memory addresses associated with memory component 120B, for example range of memory addresses 201D.

In addition, in this example the plurality of address mappings 321 comprises address mapping 321E, mapping range of memory addresses 201E to an additional range of media addresses that is an additional range of memory addresses associated with memory component 120C, for example range of memory addresses 201E.

Further in this example, the plurality of address mappings 321 comprises address mapping 321B mapping range of memory addresses 201B, address mapping 321C mapping range of memory addresses 201C, and address mapping 321F mapping range of memory addresses 201F.

When application memory of a software program executed by processing unit 101 comprises a plurality of application memory areas 301, one or more of the plurality of memory areas may be stored in one of the memory components and associated with one of the plurality of ranges of memory addresses 201. In this example, application memory area 301A of plurality of application memory areas 301 is stored in memory component 120A and is associated with range of memory addresses 201A. When processing unit 101 sends a memory access command to access application memory area 301A the memory access command comprises a first memory address in range of memory addresses 201A. When address mapping 321A maps range of memory addresses 201A to the range of media addresses that is range of memory addresses 201A, memory component 120A responds to the memory address command.

Similarly, application memory area 301B of plurality of application memory areas 301 is stored in memory component 120B and is associated with range of memory addresses 201D, and application memory area 301C of plurality of application memory areas 301 is stored in memory component 120C and is associated with range of memory addresses 201E.

According to some embodiments, memory mapping circuitry 110 optionally generates a new mapping for a memory address range of the plurality of memory address ranges 201.

Figure 4:
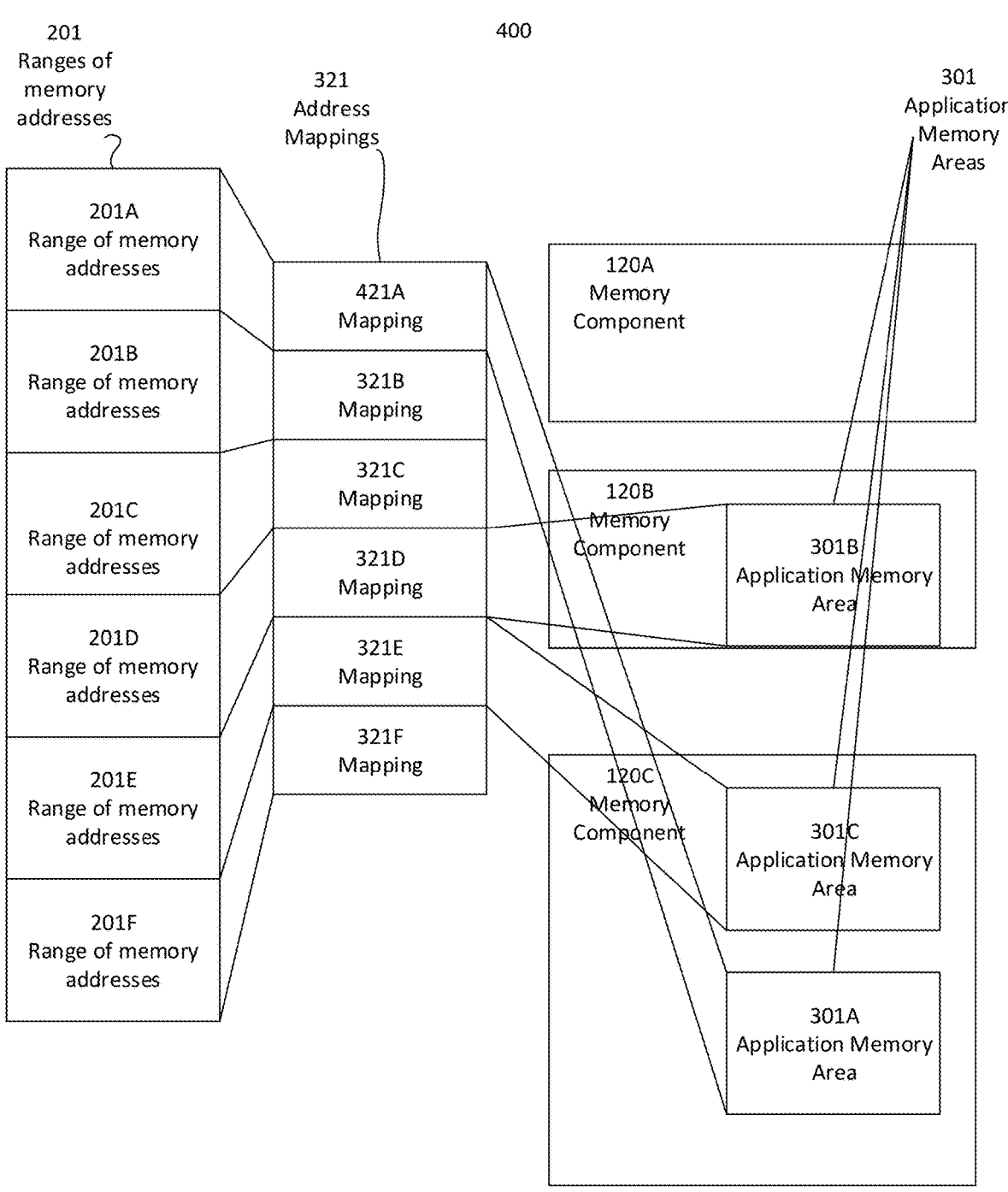
FIG. 4 is a schematic block diagram of another exemplary memory mapping, according to some embodiments.

Reference is now made also to FIG. 4, showing a schematic block diagram of another exemplary memory mapping 400, according to some embodiments. In this example, a new memory mapping 421A is generated instead of memory mapping 321A, mapping range of memory addresses 201A to a new range of media addresses that is a range of memory addresses in memory component 120C, for example range of memory addresses 201F. Optionally, application memory area 301A, that is associated with range of memory addresses 201A is now stored in memory component 120C instead of in memory component 120A. In this example, when the processing unit 101 sends a new memory access command to access application memory area 301A, the new memory access command comprises the first memory address in range of memory addresses 201A. As, in this example, address mapping 421A maps range of memory addresses 201A to the new range of media addresses that is range of memory addresses 201F, in some embodiments the memory mapping circuitry 120 replaces in the new memory access command the first memory address with a second memory address in the range of memory addresses 201F such that memory component 120C responds to the new memory address command, and not memory component 120A.

Thus, in this example, without modifying a page table that maps the plurality of application memory areas 301 to the plurality of ranges of memory addresses 201, the processing unit 101 accesses application memory area 301A using range of memory addresses 201A, despite the application memory area 301A being now stored in memory component 120C and not in memory component 120A as before.

To manage memory, the memory mapping circuitry 110 in system 100 may implement the following optional method.

Figure 5:
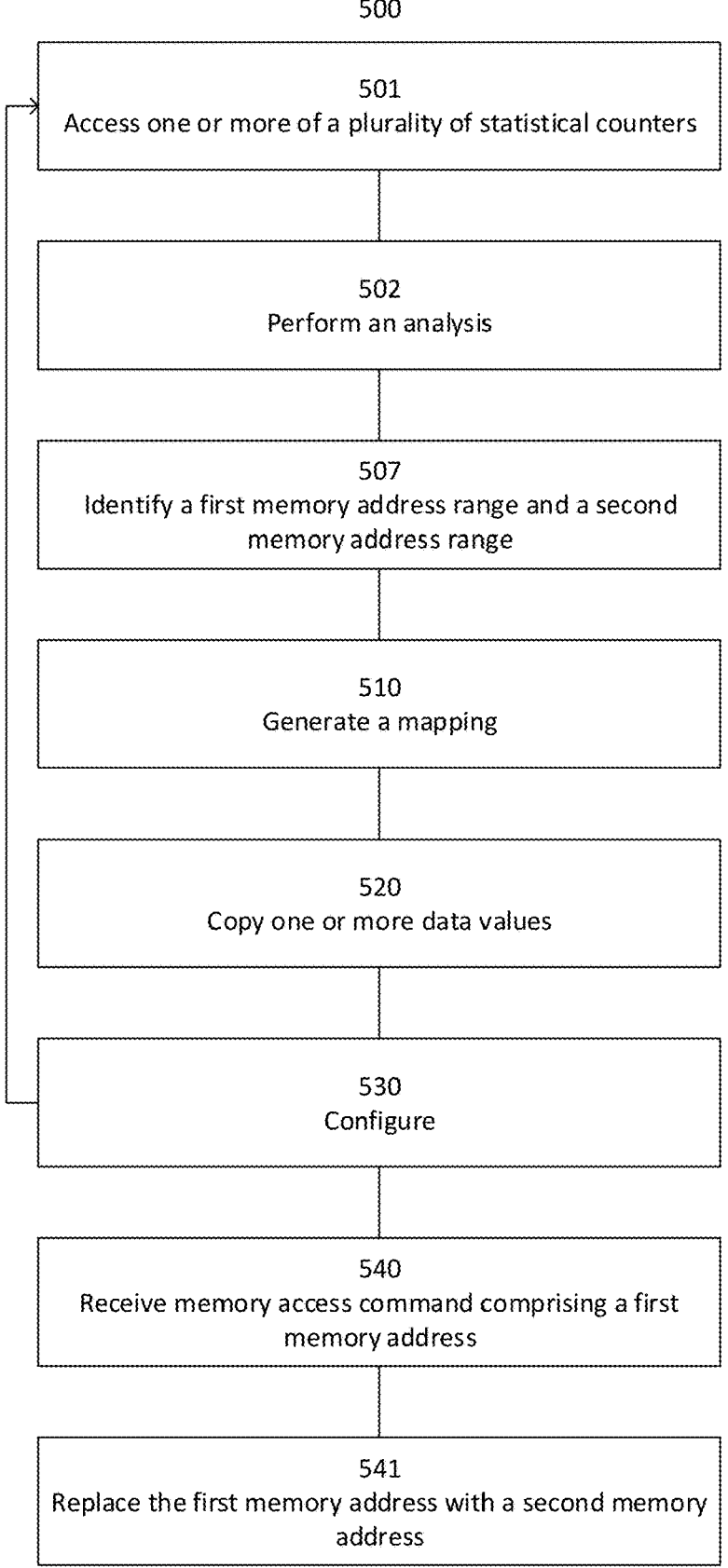
FIG. 5 is a flowchart schematically representing an optional flow of operations for memory mapping, according to some embodiments.

Reference is now made also to FIG. 5, showing a flow-chart schematically representing an optional flow of operations 500 for memory mapping, according to some embodiments.

For brevity, henceforth the term "mapping circuitry" is used to mean "memory mapping circuitry" and the terms are used interchangeably.

In such embodiments, in 501 mapping circuitry 110 accesses one or more of a plurality of statistical counters collected while the processing unit 101 executes the software program. Optionally, the plurality of statistical counters comprises a plurality of range access counters, each associated with one of the plurality of memory address ranges 201. Optionally, the plurality of statistical counters comprises one or more watermark counters, each associated with a frequency of accesses to a memory component. A watermark counter may be indicative of an amount of memory access ranges that are accessed at the frequency associated with the watermark counter. A watermark counter may be a high access counter, indicative of an amount of range access counters of the plurality of range access counters that exceed a high access threshold value, indicating frequent access to the respective memory components associated with the range access counters that exceed the high access threshold value. For example, a range access counter of range of memory addresses 201A exceeding the high access threshold value may indicate frequent access to the memory component 120A associated with range of memory addresses 201A. Another example of a watermark counter is a low access counter, indicative of an amount of range access counters of the plurality of range access counters that exceed a low access threshold value. There may be more than two watermark counters, each associated with one of a plurality of access frequencies to a memory component. Each watermark counter of the more than two watermark counters may be associated with an access threshold value indicative of the access frequency associated thereby, i.e. is indicative of an amount of range access counters of the plurality of range access counters that exceeds the threshold value associated with the watermark counter.

Optionally, accessing the one or more statistical counters comprises the mapping circuitry accessing at least one of the low access counter and the high access counter. Optionally, accessing the one or more statistical counters comprises the mapping circuitry performing an initial analysis comprising the low access counter and additionally or alternatively the high access counter that were accessed. Optionally, accessing the one or more statistical counters comprises the mapping circuitry accessing at least one range access counter subject to an initial outcome of the initial analysis.

Optionally, in each of one or more access iterations the mapping circuitry 110 accesses the one or more range access counters one at a time. Optionally, in each of the one or more access iterations the mapping circuitry 110 accesses a subset of the plurality of range access counters. Optionally, the management component 110 declines to access the at least one range access counter subject to identifying a stop condition, for example receiving an amount of range access counters exceeding a threshold value that is equal to a value of a watermark counter accessed earlier.

Optionally, at least one of the plurality of statistical counters is implemented in the one or more memory tracking circuitry 130. Optionally, the one or more memory tracking circuitry 130 is configured for updating, in each tracking iteration of a plurality of tracking iterations, at least one of the plurality of statistical counters in response to receiving a memory access command from the processing unit 101. Optionally, the memory mapping circuitry accesses the one or more statistical counters by accessing the one or more memory tracking circuitry 130.

Optionally, at least one other of the plurality of statistical counters is implemented in one of the memory components 120. Optionally, the one memory component implementing the at least one other statistical counter is a cache memory component of the processing unit 101. Optionally, the at least one other of the plurality of statistical counters is implemented in another cache memory component connected to one or more of the memory components 120.

Optionally, the memory mapping circuitry 110 accesses the one or more statistical counters while the processing unit 101 executes the software program.

In 502, the mapping circuitry 110 optionally performs an analysis of the one or more statistical counters. Optionally, in 507 the mapping circuitry 110 identifies a first memory address range, for example range of memory addresses 201A, and a second memory address range, for example range of memory addresses 201F. Optionally, the mapping circuitry 110 identifies the first memory address range and the second memory address range according to the analysis of the one or more statistical counters. For example, when the outcome of the analysis indicates high frequency access to application memory area 301A using range of memory addresses 201A, the mapping circuitry 110 may identify range of memory addresses 201A as the first memory address range.

In 510, the mapping circuitry 110 optionally generates a mapping between the first memory address range and the second memory address range, for example, mapping 421A between memory address range 201A and memory address range 201F. Optionally, mapping 421A is generated by updating the media address range of mapping 321A from range of memory addresses 210A to range of memory addresses 201F.

Optionally, the memory mapping circuitry 110 generates the mapping while the processing unit 101 executes the software program.

Optionally, in 520 the mapping circuitry 110 copies one or more data values, for example at least part of application memory area 301A, from memory component 120A which is associated with range of memory addresses 201A to memory component 120C which is associated with range of memory addresses 201F.

Optionally, before generating mapping 421A and before copying the one or more data values, the mapping circuitry 110 stops access from the processing unit 101 to memory component 120A and memory component 120C. Optionally, after copying the one or more data values, the processing circuitry 110 re-enables access from processing unit 101 to memory component 120A and memory component 120C.

Optionally, copying the one or more data values from memory component 120A to memory component 120C comprises swapping between the one or more data values and one or more other data values stored in memory component 120C such that after the swap the one or more data values are stored in memory component 120C and the one or more other data values are stored in memory component 120A. Optionally, swapping between the one or more data values and the one or more other data values comprises using one or more intermediate memory areas. Optionally the one or more intermediate memory areas are in one of the memory components 120. Optionally the one or more intermediate memory areas are in the mapping circuitry 110.

Optionally, the mapping circuitry 110 repeats one or more of 501, 502, 507, 510, and 520 in each of a plurality of management iterations. Optionally, the mapping circuitry 110 executes the plurality of management iterations while the processing unit 101 executes the software program.

Optionally, in 540 the memory mapping circuitry 110 receives one or more memory access commands from the processing unit 101. Optionally, the one or more memory access commands comprise the first memory address in range of memory addresses 201A. Optionally, in response to receiving the one or more memory access commands, in 541 the mapping circuitry 110 replaces the first memory address in the one or more memory access commands with a second memory address in memory address range 201F according to the memory mapping 421A.

Optionally, the processing unit 101 sends the one or more memory access commands while executing the software program, optionally to access application memory of the software program, for example application memory area 301A.

Optionally, the memory mapping circuitry 110 configures one or more of a plurality of threshold values in the one or more memory tracking circuitry 130, for example the low access threshold value or the high access threshold value. Optionally, the memory mapping circuitry 110 performs yet another analysis comprising the one or more statistical counters. Optionally, the memory mapping circuitry 110 configures the one or more threshold values subject to yet another outcome of the yet another analysis.

Optionally, the memory mapping circuitry 110 configures the low access threshold value and additionally or alternatively configures the high access threshold value while the processing unit 101 executes the software program, optionally in at least one of the plurality of management iterations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant memory mapping circuitries and memory tracking circuitries will be developed and the scope of the terms memory mapping circuitry and memory tracking circuitry are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for executing a software program, comprising:
    a processing unit;
    at least one memory component connected to the processing unit and mapped to at least one range of memory addresses of a plurality of memory address ranges of the processing unit; and
    a memory mapping circuitry connected to the processing unit and to the at least one memory component and configured for:
    in each management iteration of a plurality of management iterations:
    accessing one or more of a plurality of statistical counters collected while the processing unit executes the software program; and
    generating a mapping between a first memory address range of the plurality of memory address ranges and a second memory address range of the plurality of memory address ranges, based on identifying the first memory address range and the second memory address range according to an analysis of the one or more statistical counters; and
    in response to receiving from the processing unit at least one memory access command comprising a first memory address in the first memory address range, replacing in the at least one memory access command the first memory address with a second memory address in the second memory address range according to the mapping.

2. The apparatus of claim 1, wherein the plurality of statistical counters comprises a high access counter, a low access counter, and a plurality of range access counters each associated with one of the plurality of memory address ranges.

3. The apparatus of claim 2, wherein accessing the one or more statistical counters comprises:
    accessing at least one of the low access counter and the high access counter;
    performing another analysis comprising at least one of the low access counter and the high access counter; and
    accessing at least one range access counter based on an outcome of the other analysis.

4. The apparatus of claim 1, further comprising at least one memory tracking circuitry connected to the processing unit and to the at least one memory component;
    wherein at least one of the plurality of statistical counters is implemented in the at least one memory tracking circuitry that is configured for updating, in each tracking iteration of a plurality of tracking iterations, at least one of the plurality of statistical counters in response to receiving a memory access command from the processing unit; and
    wherein the memory mapping circuitry is further configured for accessing the one or more of the plurality of statistical counters by accessing the at least one memory tracking circuitry.

5. The apparatus of claim 4, wherein the memory mapping circuitry is further configured for configuring in the at least one memory tracking circuitry at least one of:
    a low access threshold value and a high access threshold value.

6. The apparatus of claim 5, wherein the memory mapping circuitry configures in the at least one memory tracking circuitry at least one of the low access threshold value and the high access threshold value based on another outcome of another analysis comprising the one or more statistical counters.

7. The apparatus of claim 1, wherein the memory mapping circuitry further comprises a plurality of address mappings, each mapping one of the plurality of memory address ranges to a media address range, where the media address range is another of the plurality of memory address ranges;
    wherein generating the mapping between the first memory address range and the second memory address range comprises updating the respective media address range of the respective address mapping of the first memory address range to be the second memory address range.

8. The apparatus of claim 1, wherein the memory mapping circuitry is further configured for:
    based on identifying the first memory address range and the second memory address range according to the analysis of the plurality of statistical counters, copying at least one data value stored in a first memory component of the at least one memory component that is associated with the first memory address range to a second memory component of the at least one memory component that is associated with the second memory address range.

9. The apparatus of claim 8, wherein application memory of the software program comprises a plurality of application memory areas, each stored in one of the at least one memory component; and
    wherein the at least one data value is part of at least one application memory area of the plurality of application memory areas.

10. The apparatus of claim 1, wherein the memory mapping circuitry is configured for executing the plurality of management iterations while the processing unit executes the software program.

11. The apparatus of claim 1, wherein the processing unit executes the software program by executing an operating system having an operating system page size for memory management; and
    wherein at least one of the plurality of memory address ranges addresses an amount of memory different from the operating system page size.

12. A method for managing memory in an apparatus for executing one or more software programs, comprising:
    in each management iteration of a plurality of management iterations, by a memory mapping circuitry connected to a processing unit and to at least one memory component connected to the processing unit, where each of the at least one memory component is mapped to at least one range of memory addresses of a plurality of memory address ranges of the processing unit:

accessing one or more of a plurality of statistical counters collected while a processing unit executes at least one of the one or more software programs; and generating a mapping between a first memory address range of the plurality of memory address ranges and a second memory address range of the plurality of memory address ranges, based on identifying the first memory address range and the second memory address range according to an analysis of the one or more statistical counters; and in response to receiving from the processing unit at least one memory access command comprising a first memory address in the first memory address range, replacing in the at least one memory access command the first memory address with a second memory address in the second memory address range according to the mapping.

13. A software program product for memory management, comprising:

a non-transitory computer readable storage medium storing:

first program instructions for:

in each management iteration of a plurality of management iterations, by a memory mapping circuitry connected to a processing unit and to at least one memory component connected to the processing unit, where each of the at least one memory component is mapped to at least one range of memory addresses of a plurality of memory address ranges of the processing unit:

accessing one or more of a plurality of statistical counters collected while a processing unit executes at least one of one or more software programs; and generating a mapping between a first memory address range of the plurality of memory address ranges and a second memory address range of the plurality of memory address ranges, based on identifying the first memory address range and the second memory address range according to an analysis of the one or more statistical counters; and second program instructions for: in response to receiving from the processing unit at least one memory access command comprising a first memory address in the first memory address range, replacing in the at least one memory access command the first memory address with a second memory address in the second memory address range according to the mapping;

wherein the first and second program instructions are executed by at least one computerized processor from the non-transitory computer readable storage medium.

* * * * *